US008386279B2

(12) United States Patent
Gore et al.

(10) Patent No.: US 8,386,279 B2
(45) Date of Patent: *Feb. 26, 2013

(54) SYSTEM AND METHOD OF MANAGING AN INSURANCE SCHEME

(75) Inventors: Adrian Gore, Houghton Estate (ZA); Herschel Phillip Mayers, Johannesburg (ZA); Kenneth Steven Rabson, Johannesburg (ZA)

(73) Assignee: Discovery Limited Holdings, Sandton (ZA)

( * ) Notice: Subject to any disclaimer, the term of this patent is extended or adjusted under 35 U.S.C. 154(b) by 447 days.

This patent is subject to a terminal disclaimer.

(21) Appl. No.: 12/477,189

(22) Filed: Jun. 3, 2009

(65) Prior Publication Data

US 2009/0299774 A1   Dec. 3, 2009

(30) Foreign Application Priority Data

Jun. 3, 2008 (ZA) ................................ 2008/04811

(51) Int. Cl.
   *G06Q 40/00* (2012.01)
(52) U.S. Cl. .......................................................... 705/4
(58) Field of Classification Search .................. 705/2–4, 705/26, 35

See application file for complete search history.

(56) References Cited

U.S. PATENT DOCUMENTS

| 4,556,216 A | 12/1985 | Ptikanen |
| 4,699,375 A | 10/1987 | Appelbaum et al. |
| 4,831,242 A | 5/1989 | Englehardt |
| 4,831,526 A | 5/1989 | Luchs et al. |
| 4,837,693 A | 6/1989 | Schotz |
| 4,860,275 A | 8/1989 | Kakinuma et al. |
| 4,975,840 A | 12/1990 | DeTore et al. |
| 5,062,645 A | 11/1991 | Goodman et al. |
| 5,136,502 A | 8/1992 | Van Remortel et al. |

(Continued)

FOREIGN PATENT DOCUMENTS

| AU | 2001/276596 | 3/2003 |
| AU | 2005/323847 | 2/2007 |

(Continued)

OTHER PUBLICATIONS

U.S. Appl. No. 12/477,225, Non-final Office Action Mar. 25, 2011.

(Continued)

*Primary Examiner* — John Pauls
(74) *Attorney, Agent, or Firm* — Fleit Gibbons Gutman Bongini & Bianco PL; Paul D. Bianco; Gary S. Winer

(57) ABSTRACT

A system for managing an insurance scheme includes a calculation module to, on the occurrence of an insured event for an insured person, calculate a subsidy for expenses for the insured person or a nominated beneficiary. The subsidy is calculated by accessing data defining a plurality of categories of expenses and determining for each category a spend amount. The spend amount is either an average historical spend amount over a period of time prior to the insured event or an actual spend amount for a period of time after the insured event. A percentage is then calculated using the insured person's participation with a wellness program. Finally, the amount of the subsidy is calculated by multiplying the percentage by the spend amount. A payment module effects payment of the subsidy to the insured person, the nominated beneficiary or a third party goods or services provider.

21 Claims, 3 Drawing Sheets

U.S. PATENT DOCUMENTS

| | | |
|---|---|---|
| 5,297,026 A | 3/1994 | Hoffman |
| 5,301,105 A | 4/1994 | Cummings, Jr. |
| 5,324,077 A | 6/1994 | Kessler et al. |
| 5,429,506 A | 7/1995 | Brophy et al. |
| 5,490,260 A | 2/1996 | Miller et al. |
| 5,542,420 A | 8/1996 | Goldman et al. |
| 5,550,734 A | 8/1996 | Tarter et al. |
| 5,574,803 A | 11/1996 | Gaborksi et al. |
| 5,630,073 A * | 5/1997 | Nolan .............................. 705/45 |
| 5,631,828 A | 5/1997 | Hagan |
| 5,655,085 A | 8/1997 | Ryan et al. |
| 5,655,997 A | 8/1997 | Greenberg et al. |
| 5,692,501 A | 12/1997 | Minturn |
| 5,722,418 A | 3/1998 | Bro |
| 5,732,709 A | 3/1998 | Tacklind et al. |
| 5,745,893 A | 4/1998 | Hill et al. |
| 5,752,236 A | 5/1998 | Sexton et al. |
| 5,774,883 A | 6/1998 | Anderson et al. |
| 5,832,467 A | 11/1998 | Wavish |
| 5,867,821 A | 2/1999 | Ballantyne et al. |
| 5,890,129 A | 3/1999 | Spurgeon |
| 5,933,809 A | 8/1999 | Hunt et al. |
| 5,933,815 A | 8/1999 | Golden |
| 5,937,387 A | 8/1999 | Summerall et al. |
| 5,956,691 A | 9/1999 | Power |
| 5,987,434 A | 11/1999 | Libman |
| 5,991,744 A | 11/1999 | Dicrese |
| 6,021,397 A | 2/2000 | Jones |
| 6,039,688 A | 3/2000 | Douglas et al. |
| 6,049,772 A | 4/2000 | Payne et al. |
| 6,085,174 A | 7/2000 | Edelman |
| 6,085,976 A | 7/2000 | Sehr |
| 6,108,641 A | 8/2000 | Kenna et al. |
| 6,112,986 A | 9/2000 | Berger et al. |
| 6,151,586 A | 11/2000 | Brown |
| 6,169,770 B1 | 1/2001 | Henely |
| 6,230,142 B1 | 5/2001 | Benigno et al. |
| 6,338,042 B1 | 1/2002 | Paizis |
| 6,385,589 B1 | 5/2002 | Trusheim et al. |
| 6,513,532 B2 | 2/2003 | Mault et al. |
| 6,587,829 B1 | 7/2003 | Camarda et al. |
| 6,602,469 B1 | 8/2003 | Maus et al. |
| 6,611,815 B1 | 8/2003 | Lewis et al. |
| 6,965,868 B1 | 11/2005 | Bednarek |
| 7,319,970 B1 | 1/2008 | Simone |
| 7,380,707 B1 | 6/2008 | Fredman |
| 7,383,223 B1 | 6/2008 | Dilip et al. |
| 7,398,217 B2 | 7/2008 | Lewis |
| 7,624,032 B2 | 11/2009 | Radson et al. |
| 7,624,059 B1 | 11/2009 | Jaffarian et al. |
| 7,630,937 B1 | 12/2009 | Mo et al. |
| 7,685,007 B1 | 3/2010 | Jacobson |
| 7,797,175 B2 | 9/2010 | Luedtke |
| 8,131,570 B2 | 3/2012 | Levin et al. |
| 2001/0037214 A1 | 11/2001 | Raskin et al. |
| 2001/0042785 A1 | 11/2001 | Walker et al. |
| 2001/0053984 A1 | 12/2001 | Joyce |
| 2002/0002495 A1 | 1/2002 | Ullman |
| 2002/0013717 A1 | 1/2002 | Ando et al. |
| 2002/0016923 A1 | 2/2002 | Knaus |
| 2002/0029158 A1 | 3/2002 | Wolff et al. |
| 2002/0035486 A1 | 3/2002 | Huyn et al. |
| 2002/0038310 A1 | 3/2002 | Reitberg |
| 2002/0042763 A1 | 4/2002 | Pillay |
| 2002/0049617 A1 | 4/2002 | Lencki et al. |
| 2002/0055859 A1 | 5/2002 | Goodman et al. |
| 2002/0087364 A1 | 7/2002 | Lerner et al. |
| 2002/0103678 A1 | 8/2002 | Burkhalter et al. |
| 2002/0111827 A1 | 8/2002 | Levin et al. |
| 2002/0116231 A1 | 8/2002 | Hele et al. |
| 2002/0116266 A1 | 8/2002 | Marshall |
| 2002/0138309 A1 | 9/2002 | Thomas |
| 2002/0152097 A1 | 10/2002 | Javors |
| 2002/0184129 A1 | 12/2002 | Arena |
| 2003/0009355 A1 | 1/2003 | Gupta |
| 2003/0028483 A1 | 2/2003 | Sanders et al. |
| 2003/0055767 A1 | 3/2003 | Tamura |
| 2003/0065561 A1 | 4/2003 | Brown |
| 2003/0105652 A1 | 6/2003 | Arena |
| 2003/0120521 A1 | 6/2003 | Sherman |
| 2003/0120570 A1 | 6/2003 | Dellinger |
| 2003/0135391 A1 | 7/2003 | Edmundson |
| 2003/0149596 A1 | 8/2003 | Bost |
| 2003/0194071 A1 * | 10/2003 | Ramian .................... 379/114.19 |
| 2003/0200101 A1 | 10/2003 | Adler |
| 2003/0200142 A1 | 10/2003 | Hicks et al. |
| 2003/0208385 A1 | 11/2003 | Zander |
| 2003/0212579 A1 | 11/2003 | Brown |
| 2003/0233278 A1 | 12/2003 | Marshall |
| 2004/0030625 A1 | 2/2004 | Radson et al. |
| 2004/0039608 A1 | 2/2004 | Mazur |
| 2004/0039611 A1 | 2/2004 | Hong et al. |
| 2004/0059608 A1 | 3/2004 | Gore et al. |
| 2004/0088219 A1 | 5/2004 | Sanders et al. |
| 2004/0098279 A1 | 5/2004 | Frazier |
| 2004/0117302 A1 | 6/2004 | Weichert et al. |
| 2004/0138928 A1 | 7/2004 | Monk |
| 2004/0267570 A1 | 12/2004 | Becker et al. |
| 2005/0010453 A1 | 1/2005 | Terlizzi |
| 2005/0033609 A1 | 2/2005 | Yang |
| 2005/0038679 A1 * | 2/2005 | Short ................. 705/2 |
| 2005/0038681 A1 | 2/2005 | Covert |
| 2005/0055249 A1 | 3/2005 | Helitzer |
| 2005/0060209 A1 | 3/2005 | Hill |
| 2005/0071205 A1 | 3/2005 | Terlizzi |
| 2005/0102172 A1 | 5/2005 | Sirmans |
| 2005/0131742 A1 | 6/2005 | Hoffman et al. |
| 2005/0222867 A1 | 10/2005 | Underwood |
| 2005/0222877 A1 | 10/2005 | Radson et al. |
| 2005/0222878 A1 | 10/2005 | Radson et al. |
| 2005/0228692 A1 | 10/2005 | Hodgdon |
| 2005/0234742 A1 | 10/2005 | Hodgdon |
| 2005/0240449 A1 | 10/2005 | Radson et al. |
| 2005/0256748 A1 | 11/2005 | Gore et al. |
| 2005/0288971 A1 | 12/2005 | Cassandra |
| 2006/0041454 A1 | 2/2006 | Matisonn et al. |
| 2006/0064320 A1 | 3/2006 | Postrel |
| 2006/0074801 A1 | 4/2006 | Pollard et al. |
| 2006/0111944 A1 * | 5/2006 | Sirmans et al. .................... 705/3 |
| 2006/0129436 A1 | 6/2006 | Short |
| 2006/0143055 A1 * | 6/2006 | Loy et al. ........................ 705/4 |
| 2006/0143056 A1 | 6/2006 | Taylor |
| 2006/0218011 A1 | 9/2006 | Walker et al. |
| 2006/0218023 A1 | 9/2006 | Conrad |
| 2007/0027726 A1 | 2/2007 | Warren et al. |
| 2007/0050215 A1 | 3/2007 | Kil |
| 2007/0050217 A1 | 3/2007 | Holden, Jr. |
| 2007/0055601 A1 | 3/2007 | Inderski |
| 2007/0061237 A1 * | 3/2007 | Merton et al. ............. 705/36 R |
| 2007/0094125 A1 | 4/2007 | Izyayev |
| 2007/0112669 A1 | 5/2007 | Snyder |
| 2007/0136093 A1 * | 6/2007 | Rankin et al. ..................... 705/2 |
| 2007/0233512 A1 | 10/2007 | Gore |
| 2008/0005016 A1 | 1/2008 | Uhlmann |
| 2008/0033751 A1 | 2/2008 | Greene |
| 2008/0046382 A1 * | 2/2008 | Metz .......................... 705/36 R |
| 2008/0071600 A1 * | 3/2008 | Johnson .......................... 705/9 |
| 2008/0082372 A1 | 4/2008 | Burch |
| 2008/0091471 A1 | 4/2008 | Michon |
| 2008/0154650 A1 | 6/2008 | Matisonn et al. |
| 2008/0172214 A1 | 7/2008 | Col |
| 2008/0189141 A1 | 8/2008 | Gore et al. |
| 2008/0197185 A1 | 8/2008 | Cronin et al. |
| 2008/0243558 A1 | 10/2008 | Gupte |
| 2008/0255979 A1 | 10/2008 | Slutzky et al. |
| 2008/0262877 A1 | 10/2008 | Hargroder |
| 2008/0312969 A1 | 12/2008 | Raines |
| 2009/0024419 A1 | 1/2009 | McClellan et al. |
| 2009/0024478 A1 * | 1/2009 | Dixon et al. .................... 705/14 |
| 2009/0037230 A1 | 2/2009 | Tracy |
| 2009/0076903 A1 | 3/2009 | Schwarzberg et al. |
| 2009/0105550 A1 | 4/2009 | Rothman |
| 2009/0150189 A1 | 6/2009 | Barron |
| 2009/0150192 A1 | 6/2009 | Gore et al. |
| 2009/0164256 A1 | 6/2009 | Fisher |
| 2009/0198525 A1 | 8/2009 | Gore et al. |
| 2009/0204441 A1 | 8/2009 | Read |

| | | | |
|---|---|---|---|
| 2009/0204446 | A1 | 8/2009 | Simon |
| 2009/0204447 | A1 | 8/2009 | Tucher |
| 2009/0240532 | A1 | 9/2009 | Gore et al. |
| 2009/0259497 | A1 | 10/2009 | Gore et al. |
| 2009/0265183 | A1 | 10/2009 | Pollard et al. |
| 2009/0299773 | A1 | 12/2009 | Gore et al. |
| 2009/0299774 | A1 | 12/2009 | Gore et al. |
| 2009/0299775 | A1 | 12/2009 | Gore et al. |
| 2009/0299776 | A1* | 12/2009 | Gore et al. ........................ 705/4 |
| 2009/0307015 | A1 | 12/2009 | Gore et al. |
| 2010/0023354 | A1 | 1/2010 | Gore et al. |
| 2010/0023356 | A1* | 1/2010 | Short ................................ 705/4 |
| 2010/0023384 | A1 | 1/2010 | Pollard et al. |
| 2010/0049541 | A1 | 2/2010 | Pollard et al. |

FOREIGN PATENT DOCUMENTS

| | | |
|---|---|---|
| AU | 2007/257457 | 1/2009 |
| AU | 2007/257458 | 1/2009 |
| AU | 2007/257546 | 1/2009 |
| AU | 2007/298514 | 2/2009 |
| AU | 2007/301521 | 5/2009 |
| CN | 2005/880047059 | 7/2007 |
| EP | 1050821 | 11/2000 |
| IL | 195735 | 12/2008 |
| IL | 195737 | 12/2008 |
| IL | 195738 | 12/2008 |
| WO | 02/47074 | 6/2002 |
| WO | 03/007230 | 1/2003 |
| WO | 2007/141695 | 12/2007 |
| WO | 2007/141696 | 12/2007 |
| WO | 2007/141968 | 12/2007 |
| WO | 2008/035280 | 3/2008 |
| ZA | 98/02005 | 3/1998 |
| ZA | 98/11943 | 12/1998 |
| ZA | 2000/04682 | 9/2000 |
| ZA | 2004/02587 | 4/2004 |
| ZA | 2004/02891 | 4/2004 |
| ZA | 2004/05935 | 7/2004 |
| ZA | 2004/06294 | 8/2004 |
| ZA | 2006/01934 | 3/2006 |
| ZA | 2006/04673 | 6/2006 |
| ZA | 2006/04674 | 6/2006 |
| ZA | 2006/04687 | 6/2006 |
| ZA | 2006/04688 | 6/2006 |
| ZA | 2006/07789 | 9/2006 |
| ZA | 2006/07992 | 9/2006 |
| ZA | 2008-03529 | 4/2008 |
| ZA | 2008/04807 | 6/2008 |
| ZA | 2008/04808 | 6/2008 |
| ZA | 2008/04809 | 6/2008 |
| ZA | 2008/04810 | 6/2008 |
| ZA | 2008/04811 | 6/2008 |
| ZA | 2009/01740 | 3/2009 |

OTHER PUBLICATIONS

U.S. Appl. No. 12/122,549, Non-final Office Action Mar. 30, 2011.
U.S. Appl. No. 12/333,465, Non-final Office Action Mar. 30, 2011.
U.S. Appl. No. 11/189,647, Response to Office Action Apr. 18, 2011.
U.S. Appl. No. 12/303,395, Non-Final Rejection Apr. 29, 2011.
U.S. Appl. No. 12/303,391, Final Office Action May 11, 2011.
U.S. Appl. No. 10/344,176, Office Action May 16, 2011.
U.S. Appl. No. 11/074,453, Requirement for Election May 23, 2011.
U.S. Appl. No. 12/303,388 Response Jun. 8, 2011.
U.S. Appl. No. 12/303,395 Final Office Action Jun. 13, 2011.
U.S. Appl. No. 12/333,465, Response filed Jun. 30, 2011.
U.S. Appl. No. 12/122,549, Response filed Jul. 21, 2011.
U.S. Appl. No. 12/303,388 Final Office Action Jul. 5, 2011.
U.S. Appl. No. 11/074,453, Final Office Action Jun. 22, 2011.
U.S. Appl. No. 12/477,225, Non Final Office Action Jul. 8, 2011.
U.S. Appl. No. 12/441,447, Non Final Office Action Aug. 1, 2011.
U.S. Appl. No. 12/477,179, Non final office action Jul. 22, 2011.
U.S. Appl. No. 12/477,208, Non final office action Jul. 22, 2011.
U.S. Appl. No. 12/477,189 non final Office Action Aug. 5, 2011.
U.S. Appl. No. 12/303,391 RCE response Aug. 11, 2011.
U.S. Appl. No. 11/189,647, Response Aug. 12, 2011.
U.S. Appl. No. 12/303,388 Response Sep. 2, 2011.

U.S. Appl. No. 12/477,213 Non Final Office Action Aug. 9, 2011.
U.S. Appl. No. 12/442,549 non Final Office Action Sep. 19, 2011.
U.S. Appl. No. 12/477,225 Final Office Action Sep. 28, 2011.
U.S. Appl. No. 12/334,465 Final Office Action Oct. 4, 2011.
U.S. Appl. No. 12/477,179, Response filed Oct. 24, 2011.
U.S. Appl. No. 12/122,549, Final Office Action Oct. 6, 2011.
U.S. Appl. No. 11/074,453, Office Action Oct. 11, 2011.
U.S. Appl. No. 12/912,040, Office Action Oct. 20, 2011.
U.S. Appl. No. 12/441,447, Response filed Nov. 1, 2011.
U.S. Appl. No. 10/344,176, Response to Office Action Nov. 9, 2009.
U.S Appl. No. 11/189,647, filed Jul. 26, 2005.
U.S. Appl. No. 11/189,647, Final Rejection May 11, 2010.
U.S. Appl. No. 11/189,647, Non-Final Rejection Aug. 14, 2009.
U.S. Appl. No. 11/189,647, Response to Office Action Feb. 15, 2010.
U.S. Appl. No. 10/819,256, filed Apr. 6, 2004.
U.S. Appl. No. 10/819,256, Final Rejection Jan. 6, 2009.
U.S. Appl. No. 10/819,256, Non-Final Rejection Mar. 18, 2008.
U.S. Appl. No. 10/819,256, Response to Office Action Sep. 18, 2008.
U.S. Appl. No. 11/097,947, filed Apr. 1, 2006.
U.S. Appl. No. 11/097,947, Non-Final Rejection Nov. 10, 2009.
U.S. Appl. No. 11/097,947, Final Rejection Jun. 7, 2010.
U.S. Appl. No. 11/097,947, Response to Office Action Mar. 10, 2010.
U.S. Appl. No. 10/818,574, filed Apr. 6, 2004.
U.S. Appl. No. 10/818,574, Non-Final Rejection Feb. 4, 2009.
U.S. Appl. No. 10/818,574, Response to Office Action May 4, 2009.
U.S. Appl. No. 11/074,453, filed Mar. 8, 2005.
U.S. Appl. No. 11/074,453, Non-Final Rejection Mar. 4, 2009.
U.S. Appl. No. 11/074,453, Requirement for Election Mar. 31, 2010.
U.S. Appl. No. 11/074,453, Notice of Non-compliant response Nov. 9, 2009.
U.S. Appl. No. 11/074,453, Response to Office Action Apr. 29, 2010.
U.S. Appl. No. 11/074,453, Response to Office Action Nov. 23, 2009.
U.S. Appl. No. 11/074,453, Response to Office Action Jul. 6, 2009.
U.S. Appl. No. 11/794,830, filed Jan. 22, 2008.
U.S. Appl. No. 11/794,830, Final Rejection Dec. 7, 2009.
U.S. Appl. No. 11/794,830, Non-Final Rejection May 27, 2009.
U.S. Appl. No. 11/794,830, Response to Office Action Sep. 28, 2009.
U.S. Appl. No. 11/794,830, Response to Office Action Apr. 7, 2010.
U.S. Appl. No. 11/903,607, filed Sep. 24, 2007.
U.S. Appl. No. 11/903,607, Final Rejection Jan. 28, 2010.
U.S. Appl. No. 11/903,607, Non-Final Rejection May 13, 2009.
U.S. Appl. No. 11/903,607, Response to Office Action Aug. 12, 2009.
U.S. Appl. No. 11/903,607, Response to Office Action Apr. 28, 2010.
U.S. Appl. No. 12/442,549, filed Mar. 24, 2009.
U.S. Appl. No. 12/477,179, filed Jun. 3, 2009.
U.S. Appl. No. 12/477,208, filed Jun. 3, 2009.
U.S. Appl. No. 12/477,213, filed Jun. 3, 2009.
U.S. Appl. No. 12/477,225, filed Jun. 3, 2009.
U.S. Appl. No. 12/303,388, Non-Final Office Action mailed Mar. 11, 2011.
U.S. Appl. No. 12/721,619, filed Mar. 11, 2010.
U.S. Appl. No. 11/715,181, filed Mar. 7, 2007.
U.S. Appl. No. 11/715,181, Non-Final Rejection Nov. 3, 2009.
U.S. Appl. No. 11/715,181, Non-Final Rejection May 12, 2010.
U.S. Appl. No. 11/715,181, Response to Office Action Feb. 3, 2010.
U.S. Appl. No. 12/303,395, Non-Final Rejection Jan. 24, 2011.
U.S. Appl. No. 12/912,009, filed Oct. 26, 2010.
U.S. Appl. No. 12/912,040, filed Oct. 26, 2010.
U.S. Appl. No. 12/112,165, Final Rejection Feb. 10, 2011.
U.S. Appl. No. 11/715,181, Response to Office Action Mar. 11, 2011.
Rintelman, Mary Jane, "Choice and cost-savings", Credit Union Management, vol. 19, No. 7, pp. 48, 50. Jul. 1996.
Woodard, Kathy, "stay healthy for real fun—and profit", Business First Columbus, vol. 12, No. 19, S.1, p. 13. Jan. 1996.
Spencer, Peter L., "New plan cuts health car costs in half (advantage of health care plan with high deductible)", Consumers' Research Magazine, vol. 76, No. 10, pp. 16. Oct. 1993.
Communuity Hearth Health Programs: Components, Ratio: John P. Elder, Thomas L. Schmid, Phyillis Dower and Sonja Hedlund; Journal of Public Health Policy; Palgrave Macmillian; 1993 winter; pp. 463-479.
Ferling ("New plans, New policies," Ferling, Rhona. Best's Review; Apr. 1993 p. 78).

"Plan Highlights for El Paso ISD" Salary Protection Insurance Plan, web-site—http://w3.unumprovident.com/enroll/elpasoisd/your_plan.htm, Mar. 3, 2008.

Consumer-Driven Health Plans Catch on as Myths Fall by Wayside (Sep. 4). PR Newswire, 1.

Art Technology Group; Discovery Holdings to exploit online interest in healthcare and life assurance with ATG commerce functionality; Revenue potential significant as 70% of Discovery members access the internet. (Oct. 28). M2 Presswire, 1.

"Absenteeism Control"; Cole, Thomas C. et al; Management Decision; London: 1992. vol. 20, Iss. 2; p. 12 (AC).

Saleem, Haneefa: "Health Spending Accounts"; Dec. 19, 2003; posted online at http://www.bls.gov/opub/cwc/print/cm20031022ar01p1.htm.

Insure.com; "The lowdown on life insurance medical exams"; Jun. 28, 2006; Imaged from the Internet Archive Waybackmachine on May 10, 2006 at http://web.archive.org/web/20060628231712/http://articles.moneycentral.msn.com/Insurance/Insureyourlife/thelowdownonlifeinsurancwemedicalexams.aspx.

Definition of insurance, New Penguin Business Dictionary, Retreieved Oct. 26, 2008 from http://www.credoreference.com/entry/6892512/.

R.C. Olmstead, "Our Products" May 2008.

Andrew Cohen; Putting Wellness to work; date Mar. 1, 1997; Athletic Business, pp. 1-7.

www.netpulse.net; Netpulsue Makes Working Out More than a Calorie-Burning Session; date Mar. 21, 1998, pp. 1-2.

www.netpulse.net; 24 Hour Fitness Partners with Netpulse; date Mar. 9, 1998; p. 1.

Trends in Medical Benefit Plan Design to Control Claim Costs; Record of Society of Actuaries; date 1982; vol. 8, No. 2, pp. 515-531.

David Richards, Return of Premium Disability Insurance; The Black Hole, dated Jul. 15, 2010, p. 1-4.

"Sidelines" WWD, p. 10—STIC Scientific and Technical Information Center, Feb. 3, 2000.

Co-pending U.S. Appl. No. 11/074,453, Final Office Action mailed Jul. 19, 2010.

Co-pending U.S. Appl. No. 11/189,647, Request for Continued Examination filed Jul. 19, 2010.

Co-pending U.S. Appl. No. 11/715,181, Response filed Aug. 12, 2010.

Co-pending U.S. Appl. No. 12/112,165, Non-final Office Action mailed Sep. 2, 2010.

Co-pending U.S. Appl. No. 10/251,120, Request for Continued Examination filed Oct. 6, 2010.

Co-pending U.S. Appl. No. 12/303,391, Non final Office Action mailed Nov. 24, 2010.

Co-pending U.S. Appl. No. 11/074,453, Response to final office action Dec. 20, 2010.

Co-pending U.S. Appl. No. 09/876,311, Non-final Office Action mailed Jul. 9, 2010.

U.S. Appl. No. 09/876,311, Response to Office Action Feb. 5, 2009.
U.S. Appl. No. 09/876,311, Response to Office Action May 28, 2009.
U.S. Appl. No. 09/876,311, Response to Office Action Sep. 10, 2009.
U.S. Appl. No. 09/876,311, Response to Office Action May 17, 2010.
U.S. Appl. No. 09/982,274, filed Oct. 17, 2001.
U.S. Appl. No. 09/982,274, Final Rejection Nov. 27, 2006.
U.S. Appl. No. 09/982,274, Final Rejection May 6, 2008.
U.S. Appl. No. 09/982,274, Final Rejection Jun. 9, 2009.
U.S. Appl. No. 09/982,274, Non-Final Rejection Mar. 3, 2006.
U.S. Appl. No. 09/982,274, Non-Final Rejection Aug. 9, 2007.
U.S. Appl. No. 09/982,274, Non-Final Rejection Oct. 17, 2008.
U.S. Appl. No. 09/982,274, Response to Office Action Sep. 6, 2006.
U.S. Appl. No. 09/982,274, Response to Office Action May 29, 2007.
U.S. Appl. No. 09/982,274, Response to Office Action Jan. 22, 2008.
U.S. Appl. No. 09/982,274, Response to Office Action Aug. 6, 2008.
U.S. Appl. No. 09/982,274, Response to Office Action Feb. 17, 2009.
U.S. Appl. No. 09/982,274, Notice of Appeal filed Sep. 9, 2009.
U.S. Appl. No. 09/982,274, Appeal Brief Filed Nov. 9, 2009.
U.S. Appl. No. 09/982,274, Reply Brief filed Apr. 2, 2010.
U.S. Appl. No. 12/112,165, filed Apr. 30, 2001.
U.S. Appl. No. 10/251,120, filed Sep. 20, 2002.
U.S. Appl. No. 10/251,120, Final Rejection Dec. 31, 2007.
U.S. Appl. No. 10/251,120, Final Rejection Jun. 25, 2009.
U.S. Appl. No. 10/251,120, Non-Final Rejection Mar. 29, 2007.
U.S. Appl. No. 10/251,120, Non-Final Rejection Jan. 5, 2009.
U.S. Appl. No. 10/251,120, Examiner Summary Oct. 21, 2009.
U.S. Appl. No. 10/251,120, Examiner Summary Jul. 6, 2010.
U.S. Appl. No. 10/251,120, Response to Office Action Sep. 28, 2007.
U.S. Appl. No. 10/251,120, Response to Office Action Oct. 7, 2008.
U.S. Appl. No. 10/251,120, Response to Office Action Apr. 6, 2009.
U.S. Appl. No. 10/251,120, Appeal Brief Filed Mar. 24, 2010.
U.S. Appl. No. 12/122,549, filed May 16, 2008.
U.S. Appl. No. 11/198,206, filed Aug. 5, 2005.
U.S. Appl. No. 11/198,206, Final Rejection Jan. 23, 2009.
U.S. Appl. No. 11/198,206, Non-Final Rejection Jun. 30, 2008.
U.S. Appl. No. 11/198,206, Response to Office Action Oct. 30, 2008.
U.S. Appl. No. 12/333,465, filed Dec. 12, 2008.
U.S. Appl. No. 12/262,266, filed Oct. 31, 2008.
U.S. Appl. No. 12/303,388, filed Dec. 4, 2008.
U.S. Appl. No. 12/303,391, filed Dec. 4, 2008.
U.S. Appl. No. 12/303,395, filed Dec. 4, 2008.
U.S. Appl. No. 12/303,399, filed Dec. 4, 2008.
U.S. Appl. No. 12/441,447, filed Mar. 16, 2009.
U.S. Appl. No. 10/344,176, filed Aug. 15, 2003.
U.S. Appl. No. 10/344,176, Final Rejection Oct. 30, 2008.
U.S. Appl. No. 10/344,176, Final Rejection Mar. 2, 2010.
U.S. Appl. No. 10/344,176, Non-Final Rejection Dec. 19, 2007.
U.S. Appl. No. 10/344,176, Non-Final Rejection Jun. 8, 2009.
U.S. Appl. No. 10/344,176, Response to Office Action May 19, 2008.
U.S. Appl. No. 10/344,176, Response to Office Action Mar. 2, 2009.
U.S. Appl. No. 09/876,311, filed Jun. 7, 2001.
U.S. Appl. No. 09/876,311, Final Rejection Oct. 23, 2006.
U.S. Appl. No. 09/876,311, Final Rejection Dec. 16, 2009.
U.S. Appl. No. 09/876,311, Non-Final Rejection Jan. 17, 2006.
U.S. Appl. No. 09/876,311, Non-Final Rejection Nov. 30, 2007.
U.S. Appl. No. 09/876,311, Non-Final Rejection Jul. 9, 2010.
U.S. Appl. No. 09/876,311, Requirement for Restriction May 18, 2007.
U.S. Appl. No. 09/876,311, Requirement for Restriction Jan. 2, 2009.
U.S. Appl. No. 09/876,311, Requirement for Restriction Jan. 16, 2009.
U.S. Appl. No. 09/876,311, Requirement for Restriction Aug. 10, 2009.
U.S. Appl. No. 09/876,311, Response to Office Action Jul. 19, 2006.
U.S. Appl. No. 09/876,311, Response to Office Action Feb. 23, 2007.
U.S. Appl. No. 09/876,311, Response to Office Action Jul. 17, 2007.
U.S. Appl. No. 09/876,311, Response to Office Action May 29, 2008.
U.S. Appl. No. 09/876,311, Response to Office Action Oct. 15, 2008.
International Search Report for PCT/IB05/003842 filed Dec. 21, 2005 (WO2006/072822).
Written Opinion for PCT/IB05/003842 filed Dec. 21, 2005 (WO2006/072822).
International Preliminary Report on Patentability for PCT/IB05/003842 filed Dec. 21, 2005 (WO2006/072822).
International Search Report for PCT/IB07/051945 filed May 23, 2007 (WO2007/141695).
Written Opinion for PCT/IB07/051945 filed May 23, 2007 (WO2007/141695).
International Preliminary Report on Patentability for PCT/IB07/051945 filed May 23, 2007 (WO2007/141695).
International Search Report for PCT/IB07/051946 filed May 23, 2007 (WO2007/141696).
Written Opinion for PCT/IB07/051946 filed May 23, 2007 (WO2007/141696).
International Preliminary Report on Patentability for PCT/IB07/051946 filed May 23, 2007 (WO2007/141696).
International Search Report for PCT/IB07/051947 filed May 23, 2007 (WO2007/141697).
Written Opinion for PCT/IB07/051947 filed May 23, 2007 (WO2007/141697).
International Preliminary Report on Patentability for PCT/IB07/051947 filed May 23, 2007 (WO2007/141697).
International Search Report published Apr. 23, 2009 for PCT/IB07/051948 filed May 23, 2007 (WO2007/141698).

Written Opinion published Mar. 13, 2009 PCT/IB07/051948 filed May 23, 2007 (WO2007/141698).
International Preliminary Report on Patentability published Mar. 17, 2009 for PCT/IB07/051948 filed May 23, 2007 (WO2007/141698).
International Search Report for PCT/IB07/053906 filed Sep. 26, 2007 (WO2008/038232).
Written Opinion for PCT/IB07/053906 filed Sep. 26, 2007 (WO2008/038232).
International Preliminary Report on Patentability for PCT/IB07/053906 filed Sep. 26, 2007 (WO2008/038232).
International Search Report for PCT/IB01/01406 filed Aug. 8, 2001 (WO2002/013438).
International Preliminary Report on Patentability for PCT/IB01/01406 filed Aug. 8, 2001 (WO2002/013438).
International Search Report for PCT/IB2007/053760 filed Sep. 18, 2007 (WO2008/035280).
Written Opinion for PCT/IB2007/053760 filed Sep. 18, 2007 (WO2008/035280).
International Preliminary Report on Patentability for PCT/IB2007/053760 filed Sep. 18, 2007 (WO2008/035280).
u1—Discovery Life "The Discovery life Portfolio", 62 pgs—2008.
u2—AFLAC "Personal Disability Income Protector", 6 pgs—Jul. 2003.
v1—Discovery Life—"Why Discovery Life"—4 pgs—May 29, 2008.
v2 GE Group Life Assurance Company—Group Short Term Disability Insurance—18 pgs, Oct. 29, 2004.
w1 Wenfin Financial Services, "Discovery Life Plan" www.bmlink.co.za/WenFininsurance—Website download, 58 pgs, Aug. 5, 2011.
w2 EconEdLink—"How Long is Your life?"—Tutorial from EconEdLink.com web-site, 4 pgs, posted Sep. 13, 2004.
x1 AFLAC—"Personal Cancer Indemnity Plan" Level 3, 11 pgs, Jun. 2005.
x2 Gendell Murray, "Retirement age Declines again in 1990s", Monthly Labor Review, 10 pgs, Oct. 2001.
u1—Discovery Life "Benefit version Reference Guide" Oct. 2008.
v1—Discovery Life—"Discovery life Group Risk Life Plan".
w1 WenfinWebPages for Discovery Life Nov. 13, 2006.
x1 AFLAC—Discovery Life "Application for Discovery Card Protector" Nov. 2007.
u2—Discovery Life "The Disovery Life Portfolio" Nov. 20, 2008.
w2 Dsicovery Life "Discovery Individual LIE Plan Guide" Aug. 4, 2009 EconEdLink—How Long is Your life?—Tutorial from EconEdLink.com web-site, posted Sep. 13, 2004.
x2 Discovery Life "The Discovery Life Portfolio" Jun. 2008.
u3 Discovery Invest Group Retirement {Plan Financial Solutions for employees: Oct. 17, 2009.
014 M. Doty et al., Issue Brief, Maintaining Health Insurance During a Recession, 6 pgs, 2001.
014 R. Merhr, ARIA—The Concept of the Level -Premium Whole Life Insurance Policy, The Journal of Risk and Insurance, vol. 42, No. 3 (Sep. 1975) pp. 419-431.
014 STIC Search Report EIC 3600, Scientific and Technical Information Center, 63 pgs.
Web-site Google Search Google Employee Wellness Payment dated Feb. 12, 2012.
Wellness Source—How Much Does a Good Wellness Program Cost? 2 pgs.
030—South African Patent Journal No. 6 of 1, Jun. 2099, vol. 42, p. 229.
030—South African Patent Application 2008/04810 filed Jun. 26, 2009—Annotated with Paragragh numbers.
030-South African Patents Act, No. 57 of 1978 as amended by Patents Amendment Act No. 58 of 2002.
030—Discovery Life, "Technical guide for financial advisers" Nov. 11, 2009.
U.S. Appl. No. 12/112,165, Non Final Office Action mailed May 17, 2012.
U.S. Appl. No. 12/122,549, Office Action Feb. 15, 2012.
U.S. Appl. No. 12/303,395 Response filed May 11, 2012.
U.S. Appl. No. 12/303,399 Final Office Action Mar. 14, 2012.
U.S. Appl. No. 11/794,830, Supplemental response May 18, 2012.
U.S. Appl. No. 12/442,549 Final Office Action Feb. 6, 2012.
U.S. Appl. No. 12/477,213 Supplemental Response filed Jun. 6, 2012.
U.S. Appl. No. 12/477,213 Supplemental Response filed Jul. 9, 2012.
U.S. Appl. No. 12/912,040, Supplemental response filed Jun. 14, 2012.
U.S. Appl. No. 13/472,571, filed May 16, 2012.
U.S. Appl. No. 13/486,002, filed Jun. 1, 2012.
U.S. Appl. No. 12/912,009 Response filed Aug. 31, 2012.
U.S. Appl. No. 12/122,549, RCE response Jan. 6, 2012.
U.S. Appl. No. 12/303,399 Office Action Nov. 10, 2012.
U.S. Appl. No. 12/303,399 Response filed Feb. 9, 2012.
U.S. Appl. No. 12/441,447, Final Office Action Jan. 10, 2012.
U.S. Appl. No. 11/074,453, Response filed Jan. 11, 2012.
U.S. Appl. No. 11/794,830, Non-Final Rejection Dec. 19, 2011.
U.S. Appl. No. 11/903,607, Office Action Nov. 30, 2011.
U.S. Appl. No. 11/903,607, Response filed Feb. 29, 2012.
U.S. Appl. No. 12/477,213 Response filed Feb. 8, 2012.
U.S. Appl. No. 12/721,619, Preliminary Amendment filed Nov. 3, 2011.
U.S. Appl. No. 12/912,009 Non-final Office Action Dec. 19, 2011.
U.S. Appl. No. 13/325,719, filed Nov. 3, 2011.
U.S. Appl. No. 13/386,431, filed Jan. 23, 2012.
U.S. Appl. No. 13/365,430, filed Feb. 3, 2012.
U.S. Appl. No. 13/365,527, filed Feb. 3, 2012.
U.S. Appl. No. 13/365,566, filed Feb. 3, 2012.
U1 Gore, The case for Consumer Engagement in the funding of Healthcare IAAHS 2007.
V1 Preferred Health Systems—Preferred News—vol. 9, issue 1, Spring 2008.
W1 Discovery Why Discovery Life May 29, 2008.
X1 BX Link Your Company Websites Discovery Life Plans Jan. 13, 2003.
U2 Destiny Health Individual Brochure Health Coverage modified Oct. 18, 2006.
V2 DaSilva Roseanne The Impact of Wellness Activities on Hospital Claims Experience, Joint Colloquium of the IACA, PBSS and IAAHS May 2008 Oct. 1, 2004.
ATG Customer Success Story: Discovery Heathly 2006 ART Tech Group, Inc.
Discovery Vitality; Discovery Vitality 2009 Sep. 12, 2008.
Discovery Invest, Group Retirement Plan Finanical solutions for employees Jan. 17, 2009.
Baker et al. Pay for Performance Incentive Programs in Healthcare; Market Dynammics and Business Process-Research Report 2003.
PruHealth, Individual Policy Document Jul. 2008.
Discovery Vitality, Lesson Plans Grade 4 nad 5 Apr. 2, 2008.
HLC Financial Services, Discovery News Feb. 2009.
The Discovery Life, "Technical guide for financial advisers" Nov. 2008.
International Search Report dated Nov. 2, 2011 for PCT/IB11/51627 (WO2011/128873).
Flexible Spending Account, from Wikipedia encyclopedia, pp. 7, retrieved Sep. 28, 2012.
Article, Health Care Spending Accounts, AHIP America's Health Insurance Plans, pp. 12, retrieved Sep. 28, 2012.
Health Reimbursement Account, from Wikipedia encyclopedia, pp. 4, retrieved Sep. 28, 2012.
Health Savings Account, from Wikipedia encyclopedia, pp. 10, retrieved Sep. 28, 2012.
Saleem- Article, Health Spending Accounts, U.S. Bureau of Labor Statistics, pp. 5, retrieved Sep. 28, 2012.
Long-Term Insurance Act, No. 52, Jan. 1, 1998, Administration of Act, 55 pgs.
Government Gazette, Republic of South Africa, Insurance laws Amendment Act 2008, vol. 521, Cape Town, Nov. 5, 2008, No. 31578, 36 pgs.
Regulation Gazette No. 6652, Government Notice, Medical Schemes Act, vol. 412, Oct. 20, 1999, 67 pgs.

Government Gazette, Republic of South Africa, Staatskoerant, Cape Town, vol. 399, Sep. 23, 1998, No. 19277, 49 pgs.
U.S. Appl. No. 13/638,608, filed Sep. 30, 2012.
U.S. Appl. No. 13/648,309, filed Oct. 10, 2012.
U.S. Appl. No. 13/641,143, filed Oct. 15, 2012.
U.S. Appl. No. 13/641,145, filed Oct. 15, 2012.
U.S. Appl. No. 13/641,155, filed Oct. 15, 2012.

* cited by examiner

SYSTEM AND METHOD OF MANAGING AN INSURANCE SCHEME

BACKGROUND OF THE INVENTION

The present application relates to a system and method of managing an insurance scheme.

The present invention may be implemented by a traditional life insurance plan operator for its members or may be implemented by another party.

Conventionally, insurance policies such as life insurance policies operate on the basis that an insured person, sometimes referred to as an insured life, pays a premium to the life insurer, and the life insurer pays a predetermined sum, referred to as the sum assured, to the insured life or his/her beneficiary on the occurrence of an insured event. Typical insured events are the insured life suffering disability, contracting a dread disease or dying.

However, it will be appreciated that the processing and finalising of the payment can take some time, in some cases up to several months or even years. In this instance the insured person may have short term financial difficulties if they are dependent on this payment.

A system and method of addressing this is therefore required.

SUMMARY OF THE INVENTION

According to one example embodiment, a system for managing an insurance scheme includes:
  a calculation module to, on the occurrence of an insured event for an insured person of the scheme, calculate a subsidy for subsidising expenses for the insured person or a nominated beneficiary of the insured person, wherein the subsidy is calculated by accessing data defining a plurality of categories of expenses and determining for each defined category of expenses a spend amount being either an average historical spend amount over a period of time prior to the insured event or an actual spend amount for a period of time after the insured event, the calculation module further calculating a percentage amount by accessing data indicating the insured person's participation with a wellness programme, the calculation module then calculating the amount of the subsidy for each category of expenses by multiplying the percentage by the spend amount; and
  a payment module to obtain the amount of the subsidy for each category of expenses and to effect payment of the subsidy for each category of expenses to the insured person, the nominated beneficiary or a third party goods or services provider.

The system may further include an expenses module to define the plurality of categories of expenses that may include at least one of the group consisting of food, clothing, transport, utilities, communication and accommodation expenses.

The system may also include a life changing events module to define a plurality of life changing events as insured events that may include at least one of disability, contracting a dread disease and dying.

The payment module may in addition or alternatively identify a credit card or debit card of the insured person and whereby the subsidy is implemented by the payment module crediting the credit card or debit card.

The system may also include a wellness programme module to define a wellness programme and monitor the compliance of the wellness programme by the insured person.

The wellness programme module monitors the compliance of the insured person with the wellness programme by receiving insured person usage information associated with the insured person's usage of the wellness programme, which usage information received includes information associated with a plurality of separate and distinct occurrences of wellness programme participation by the insured person.

The wellness programme module may determine, based on the usage information, a points value or a status level associated with the insured person for the wellness programme, wherein the points value or the status level indicates a degree of participation in the wellness programme and wherein the calculation module uses the points value or status level to calculate the percentage amount.

According to another example embodiment apparatus for managing an insurance scheme includes:
  means for calculating a subsidy for an insured person or a nominated beneficiary of the insured person on the occurrence of an insured event by accessing data defining a plurality of categories of expenses and determining for each defined category of expenses a spend amount being either an average historical spend amount over a period of time prior to the insured event or an actual spend amount for a period of time after the insured event, the means further calculating a percentage amount by accessing data indicating the insured person's participation with a wellness programme, the means then calculating the amount of the subsidy for each category of expenses by multiplying the percentage by the spend amount; and
  means for effecting payment of the subsidy by obtaining the amount of the subsidy for each category of expenses and then effecting payment of the subsidy for each category of expenses to the insured person, the nominated beneficiary or a third party goods or services provider.

DESCRIPTION OF EMBODIMENTS

The systems and methodology described herein relate to a system and method of managing an insurance scheme such as a life insurance scheme.

Conventional life insurance schemes operate on the basis that an insured person, referred to as the insured life, pays premiums on a regular basis to the life insurer, specifying a sum assured which is an amount to be paid out on the occurrence of an insured event. For example, on the death of the insured life, a predetermined death benefit is paid to the nominated beneficiaries of the insured life. If the insured life is disabled or suffers a dread disease, a different, lesser amount is paid out.

The system and method will be described with reference to these kinds of schemes but it will be appreciated that the method and system could equally be applied to other types of insurance schemes.

It will also be appreciated that the system and methodology may be implemented by any relevant person or organisation. For example, the system and methodology may be operated by the organisation which operates the life insurance scheme or may be implemented by another associated organisation. In one example the system and methodology may be implemented by a financial organisation which issues credit cards to its members.

For purposes of illustration, the system and methodology will be described herein as being operated by the managers of a life insurance scheme.

Figure 1:
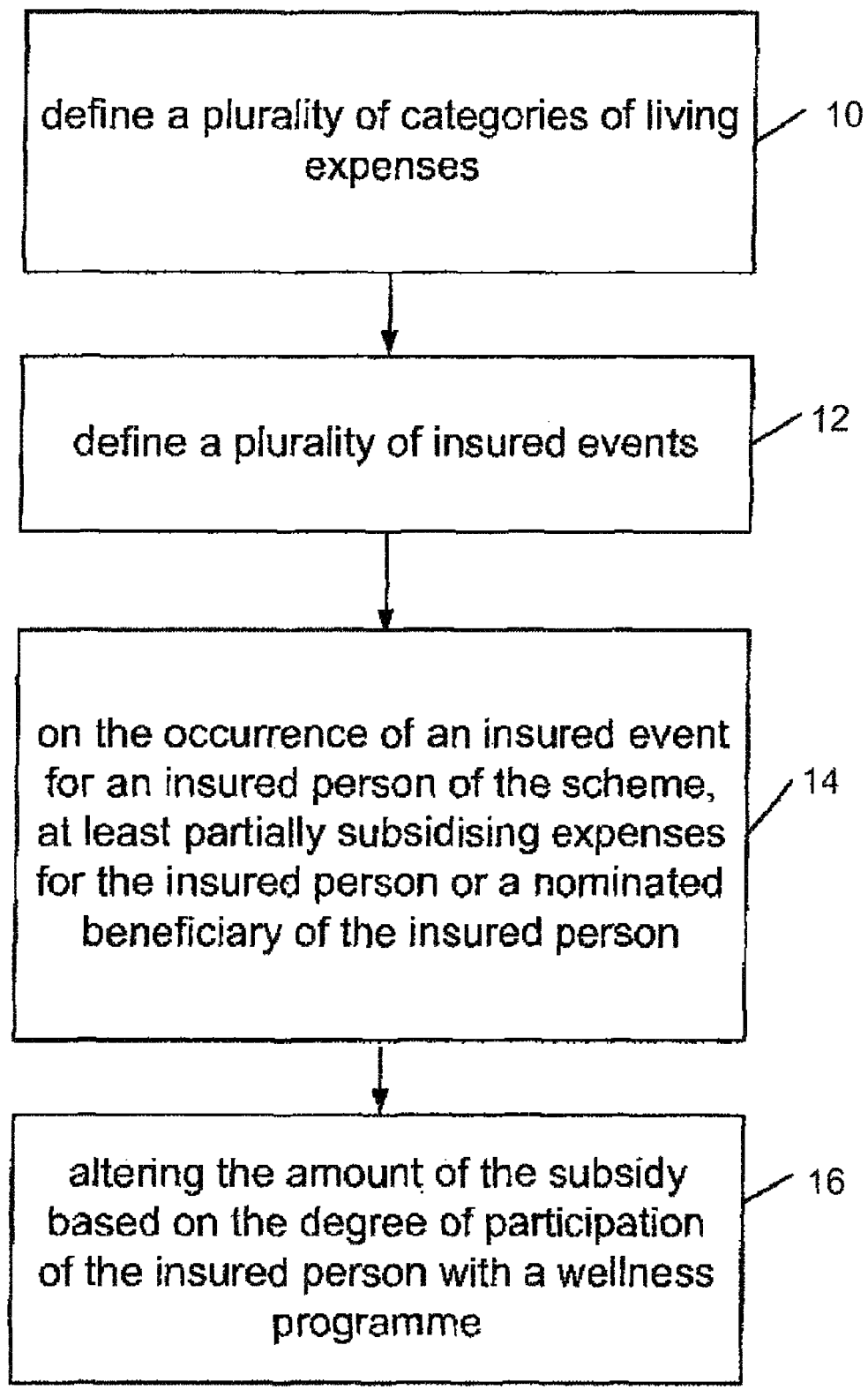
FIG. 1 is a flow chart illustrating the methodology of an example embodiment.

Referring to FIG. 1, a plurality of categories of expenses are defined (block 10), for example living expenses. In the illustrated example, the categories of living expenses include at least one of the group consisting of food, clothing, transport, utilities, communication and accommodation expenses. It will be appreciated that the method may include defining all of these as categories of living expenses.

In addition to this, a plurality of life changing events are defined (block 12). The plurality of life changing events in the example includes disability, contracting a dread disease or dying as these are typical of the kind of events which are insured by life insurance schemes. However, it will be appreciated that in other contexts these life changing events may be other events such as the birth of a child or changing jobs to name but a few examples.

In any event, the occurrence of a life changing event for an insured person of the scheme results in an at least partial subsidising of expenses in the category of living expenses for the insured person or a nominated beneficiary of the insured person (block 14). Typically the subsidy is arranged for the insured person but where the insured person has died or is otherwise incapacitated the subsidy will be activated for a beneficiary that the insured person has nominated prior to the event.

The subsidy may be a predetermined percentage of the expenses which will be incurred in the defined category of living expenses.

The percentage is altered depending on the degree of participation of the insured person with a wellness programme (block 16).

In addition, the compliance of the insured person with a wellness programme is monitored.

An example of such a wellness programme is presently managed by the applicant that manages a traditional life and health insurance plan together with their wellness programme disclosed in the applicant's South African granted patent number ZA 99/1746, the contents of which are incorporated herein by reference.

In an example wellness programme, members participate in approved related facilities and/or services. For example, members use gymnasiums, Smoke Enders™ and Weighless™.

In one example, members are awarded points and depending on the total number of points allocated to a member, they fall within one of five statuses. In the implementation of the wellness programme, these statuses have been named in ascending order of value, blue, bronze, silver, gold and diamond. All members are placed initially in the blue status. Once a member has accumulated a predetermined number of points, his/her status is upgraded to the next appropriate level.

It will be appreciated that for purposes of the present invention the wellness programme could be operated by the insurer or could be operated by a third party that operates the wellness programme and then informs the insurer of the degree of participation of the insured person with the wellness programme.

This could occur by a third party transmitting data to at least one server 22 (FIG. 2) operated by the insurer. The data is received at the at least one server 22 and stored in a database 32 associated with the at least one server.

In one example the data will include at least an identity of the insured person and data identifying the status of the insured person, for example blue, bronze, silver, gold and diamond.

In order to determine the status, a monitoring of the compliance of the insured person with the wellness programme includes receiving insured person usage information associated with the insured person's usage of the wellness programme and determining, based on the usage information, a status level associated with the insured person for the wellness programme, wherein the status level indicates a degree of participation in the wellness programme The usage information received may include information associated with a plurality of separate and distinct occurrences of wellness programme participation by the insured person.

In addition, the method may further include determining a status level associated with the insured person that further includes receiving the usage information from an information processing system and assigning a given point value to each separate and distinct occurrence of wellness programme participation.

A total point value is determined based on an accumulation of each given point value assigned to each separate and distinct occurrence of wellness programme participation The total point value is then compared to a plurality of point ranges, each point range in the plurality of point ranges being associated with a status level and identifying a point range in the plurality of point ranges corresponding to the total point value.

Finally, a status level is assigned that is associated with the point range that has been identified to the at least one employee.

Then based on the degree of participation of the insured person with the wellness programme the at least one benefit is altered (block 16).

An example of the above is as follows:

| Category | Status | | | | |
| --- | --- | --- | --- | --- | --- |
| | Blue | Bronze | Silver | Gold | Diamond |
| A & D | 10% | 15% | 25% | 35% | 50% |
| B | 5% | 7.50% | 15% | 25% | 35% |

Category A means a total permanent Disability as determined by a defined medical definitions and Activity Daily living scoring mechanism. Category B means a partial, permanent Disability as determined by a defined medical definitions and Activity Daily living scoring mechanism and Category D means the total permanent inability of a policyholder to do his nominated occupation due to a disability event Thus where the insured person is blue status then 10% of their spending will be paid for on their behalf while if they are diamond status 50% of their spending will be paid for on their behalf.

In one example, the benefit may be available for a predetermined period such as 12 months, for example. In another embodiment this period will typically not be too long a period where this is intended to be a bridging type of assistance. In other embodiments this may be intended as long term assistance and could then be extended for a number of years, such as until the nominated beneficiary passes away or reaches a certain age.

The subsidy could also take any one of a number of different forms.

In one example, the subsidy is effected by reimbursing the insured person or their nominated beneficiary for expenses incurred in the defined category of living expenses.

Alternatively, the subsidy is effected by paying third parties for expenses incurred in the defined category of living expenses on behalf of the insured person or their nominated beneficiary.

In a third example, the subsidy is effected by calculating the spending of the insured person in the various categories of living expenses for a time period prior to the life changing event and then paying a percentage of this amount to the insured person or their nominated beneficiary.

Alternatively, the subsidy could be effected by combining one or more of the above methods.

The subsidy may have a maximum or minimum amount applicable calculated by determining the spending of the insured person in the various categories of living expenses for a time period prior to the life changing event, such as be six months, for example.

In one embodiment, the method is linked to a credit card of the insured life whereby the subsidy is implemented by paying a portion of the amount spent on the credit card on behalf of the insured person or the nominated beneficiary.

In this example, the amount of spending in any of the categories of living expenses is determined by checking historical spending on the credit card.

The methodology works particularly well when implemented in conjunction with a credit card which is issued to the insured person. This is because the insured person can continue to purchase the necessary goods using the credit card and certain entries in the credit card will be automatically paid for by the insurer.

It will be appreciated that the insured person or their nominated beneficiary is provided short term protection following a life changing event so that they are assisted in continuing their day to day living.

Figure 2:
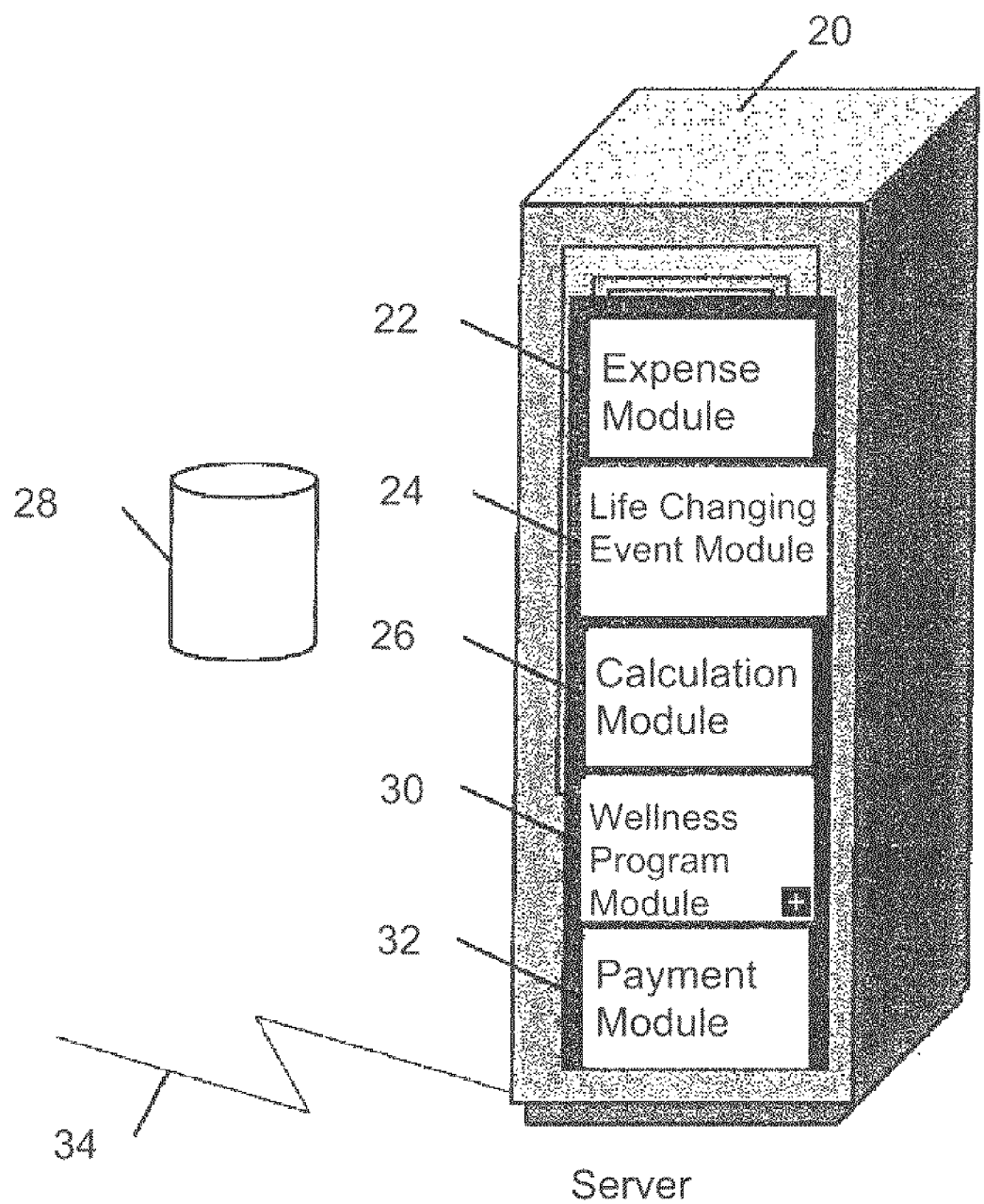
FIG. 2 is a block diagram illustrating an example system to implement the methodologies described herein.

FIG. 2 illustrates apparatus in the form of an exemplary system for implementing the above methodologies.

A server 20 includes a number of modules to implement the methodologies described above.

An expenses module 22 defines a plurality of categories of expenses. The module may be constructed to define the plurality of expenses as expenses generally recognised as daily, weekly or monthly living expenses, all generally referred to as living expenses. In one example embodiment, the categories of living expenses include at least one of the group consisting of food, clothing, transport, utilities, communication and accommodation expenses for example. It will be appreciated that the expenses module 22 may be specifically programmed to define all of these as categories of living expenses.

Once the expenses module 22 defines the plurality of categories of expenses, the module 22 accesses a memory and stores the defined plurality of categories of expenses in the memory.

In one example embodiment, the memory could take the form of a database 28 connected to the server 20. In other embodiments the memory could be located on the server 20 or on another server not illustrated in this example system. In either case, the memory is in data communication with the expenses module 22 and accessible by the expenses module 22 which is able to read and write data to the memory.

In addition, a life changing events module 24 defines a plurality of life changing events.

The module 24 is constructed to define the plurality of life changing events which in one embodiment includes disability, contracting a dread disease or dying as these are typical of the kind of events which are insured by life insurance schemes. However, it will be appreciated that in other contexts these life changing events may be other events such as the birth of a child or changing jobs to name but a few examples of what the module 24 may define as a plurality of life changing events.

Once the life changing events module 24 defines the plurality of life changing events, the module 24 accesses a memory and stores the defined plurality of categories of expenses in the memory.

In one example embodiment, the memory could take the form of the database 28. In other embodiments the memory could be located on the server 20 or on another server not illustrated in this example system. In either case, the memory is in data communication with the module 24 and accessible by the module 24 which is able to read and write data to the memory.

The memory accessible by the module 24 may be the same or a different memory to the one accessible by the module 22.

A calculation module 26, receives an instruction that a life changing event for an insured person of the scheme has occurred.

In an example embodiment, the instruction received includes data identifying the insured person and data identifying a life changing event that has occurred to the insured person.

The module 26 accesses at least one memory to validate that the identified insured person is in fact insured and to validate that the identified life changing event is one of the plurality of defined life changing events stored in the memory. If both of these are validated, the calculation module 26 proceeds to the next step of calculating the subsidy.

The calculation module 26 is constructed to calculate the subsidy using a plurality of factors as will be described in more detail below.

Firstly, the calculation module 26 accesses the memory or memories storing the plurality of defined categories of expenses.

Next, the calculation model 26 determines what percentage of expenses in each of the plurality of defined categories of expenses is to be subsidised.

The percentage is linked to the insured person's compliance with a wellness programme. In one example embodiment, an indicator of the insured person's compliance with the wellness programme has been received and stored in a memory, for example database 28. The indicator may be a number of points accrued by the insured person. Alternatively or in addition the indicator could be a status level of the insured person in the wellness programme.

In an alternate embodiment, a wellness programme module 30 is incorporated into the system of the present invention.

The wellness programme module 30 is specifically constructed to define a wellness programme and monitor the compliance of the wellness programme by the insured person.

The monitoring of the compliance of the insured person with the wellness programme includes receiving by the wellness programme module 30, insured person usage information associated with the insured person's usage of the wellness programme.

The usage information received may include information associated with a plurality of separate and distinct occurrences of wellness programme participation by the insured person.

The wellness programme module 30 determines, based on the usage information, a points value or a status level associated with the insured person for the wellness programme, wherein the points value or the status level indicates a degree of participation in the wellness programme In addition, the wellness programme module 30 may further be constructed to determine a status level associated with the insured person by receiving the usage information from an information processing system and assigning a given point value to each separate and distinct occurrence of wellness programme participation.

A total point value is determined by the wellness programme module 30 based on an accumulation of each given point value assigned to each separate and distinct occurrence of wellness programme participation The total point value is then compared to a plurality of point ranges by the wellness programme module 30, each point range in the plurality of point ranges being associated with a status level and identifying a point range in the plurality of point ranges corresponding to the total point value.

Finally, a status level is assigned by the wellness programme module 30 that is associated with the point range that has been identified to the at least one employee.

The wellness programme module 30 then writes the total points value or the status level to a memory, for example the database 28.

In either case the calculation module 26 accesses the memory and retrieves the stored total points value or status level. The calculation module 26 then uses this to alter the percentage of the subsidy.

In addition, the calculation module 26 may also use the type of life changing event that has occurred to the insured person to further alter the percentage of the subsidy.

Once the percentage has been calculated, the calculation module 26 uses the percentage to calculate the actual subsidy.

Next the calculation module 26 calculates a spend amount to be multiplied by the percentage to determine the subsidy.

In one example embodiment the spend amount is calculated by the calculation module 26 using historical spend of the insured person in the defined categories of expenses for a time period before the occurrence of the insured event. In another example embodiment the spend amount is calculated using actual spend by the insured person or their nominated beneficiary after the occurrence of the insured event.

Where the historical spend of the insured person is used, the calculation module 26 obtains data regarding this historical spend. The data could either be previously stored in a memory, such as in the database 28, which is then accessed by the calculation module 26.

Alternatively or in addition, the calculation module 26 communicates with a financial server to obtain this information.

One example of how this historical spend information could be used by the calculation module 26 is that the module 26 for each category of expense calculates an average monthly expenditure for a time period prior to the insured event occurring, for example. In this way, the module 26 calculates the average monthly expenditure for each category of expense over a predetermined time period. The time period could be six months or a year for example.

The calculation module 26 is constructed to then use the percentage obtained as described above together with the historical spend to calculated the amount of the subsidy. This will typically entail the calculation module 26 multiplying the percentage obtained by the average monthly expenditure for each category of expense. This calculation will provide the subsidy for each category of expense for a determined duration after the occurrence of the insured event.

Alternatively, where actual spend is used, the calculation model 26 determines the actual spend for a time period after the occurrence of the insured the event. This time period could be for a month, for example, whereby the actual spend in each of the categories of expenses is determined by the calculation module 26.

As described above, this information could either be already stored in a memory, such as in the database 28, which is then accessed by the calculation module 26 or alternatively or in addition, the calculation module 26 communicates with a financial server to obtain this actual spend information.

The calculation module 26 then multiplies the percentage obtained by the monthly actual spend. This calculation will provide the subsidy for each category of expense for a determined duration after the occurrence of the insured event.

The calculation module 26 in one example applies a maximum amount to the calculated subsidy.

Once the subsidy is calculated by the calculation model 26, the amount of the subsidy is stored in a memory, for example the database 28.

Alternatively, or in addition, the amount of the subsidy is transmitted to a payment module 32.

The payment module 32 is constructed to receive the amount of the subsidy or access the amount of the subsidy from where it is stored in a memory and to then effect the payment of the subsidy amount. It will be appreciated that the payment of the subsidy amount could be effected in a number of ways.

In addition, the subsidy amount is either paid to the insured person, their nominated beneficiary or to a third party from whom the insured person or their nominated beneficiary has purchased or will purchase goods or services.

In one example embodiment, the payment module 32 communicates with a financial server to effect the payment. The financial server may be a financial server operated by the insurer or may be a financial server operated by a third-party financial institution.

In another example embodiment, where the insurer operates its own credit or debit card scheme, the payment module 32 is able to effect the payments to the insured person or their nominated beneficiary by crediting the subsidy to the credit or debit card.

In another embodiment, the payment may be effected by the payment module 32 issuing a preloaded debit card to the insured person or their nominated beneficiary, wherein the debit card contains the amount of the subsidy.

In yet another embodiment, the payment may be effected by the payment module 32 purchasing vouchers from a service provider for the subsidy amount where the service provider provides goods or services in one of the categories of expensive and then issuing these vouchers to the insured person or their nominated beneficiary.

In addition, the server 20 is typically connected to a communications network 34 for communications with other computers to implement the methodologies described above.

In any event, in one example embodiment, the modules described above may be implemented by a machine-readable medium embodying instructions which, when executed by a machine, cause the machine to perform any of the methods described above.

In another example embodiment the modules may be implemented using firmware programmed specifically to execute the method described herein.

It will be appreciated that embodiments of the present invention are not limited to such architecture, and could equally well find application in a distributed, or peer-to-peer, architecture system. Thus the modules illustrated could be located on one or more servers operated by one or more institutions.

It will also be appreciated that in any of these cases the modules form a physical apparatus with physical modules specifically for executing the steps of the method described herein.

Operating Environment

Figure 3:
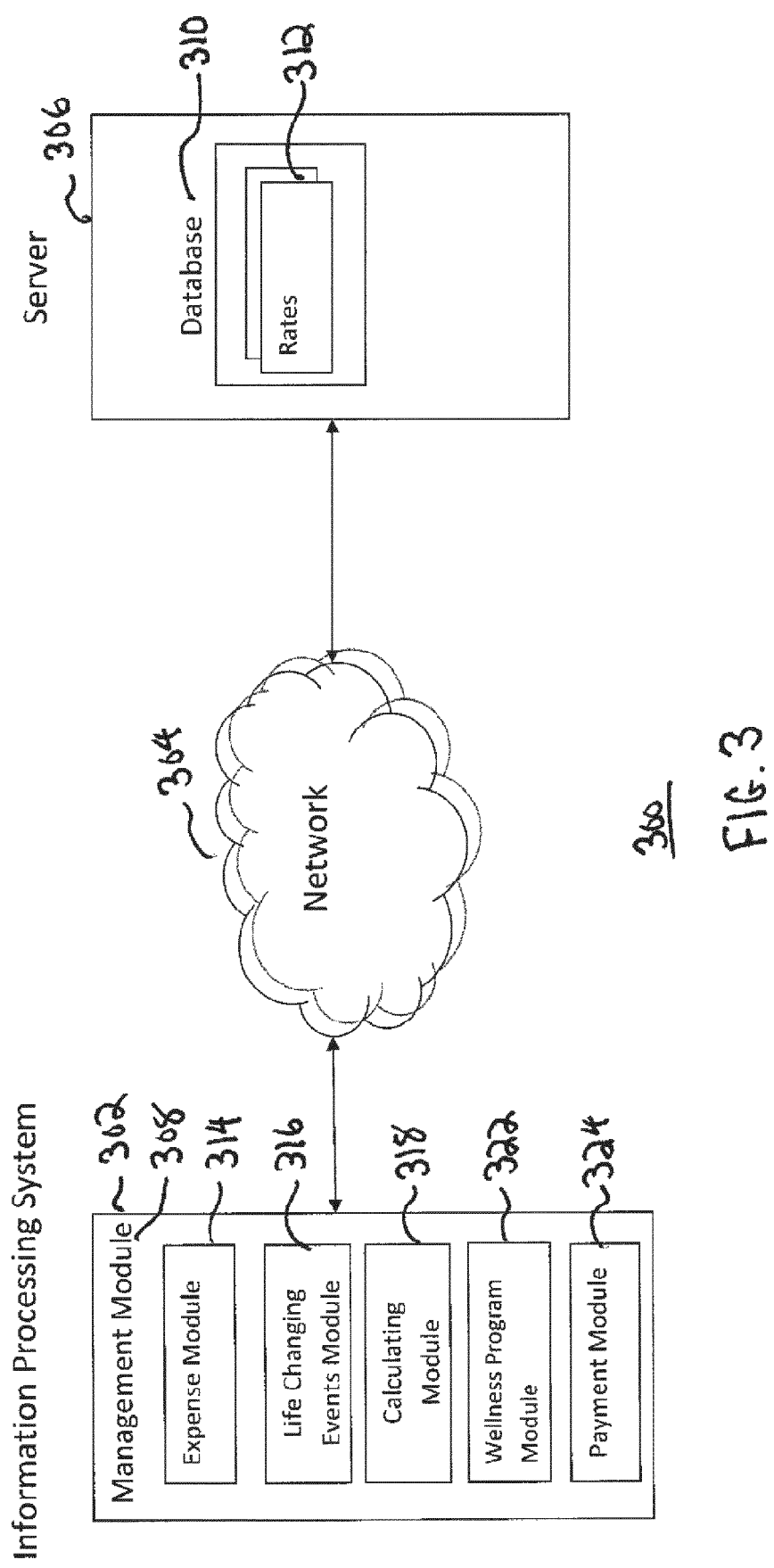
FIG. 3 is a block diagram illustrating an example of one operating environment of the system in FIG. 2.

According to one embodiment of the present invention, as shown in FIG. 3, a system and method of 300 for managing an insurance scheme/product is shown. In one embodiment, the system 300 includes one or information processing systems 302 associated with an insurance provider, a network 304, and one or more servers 306. It should be noted that the information processing system 302 is not restricted to being associated with the entity providing insurance to individuals, but can be associated with another entity as well. The insurance provider can provide one or more types of insurance such as a (but not limited to) life insurance scheme to name one example and/or medical insurance to individuals.

The network 304, in one embodiment, is a wide area network, local area network, wireless network, or the like. The information processing system 302 includes a management module 308. The management module 308, in one embodiment, manages an insurance scheme/product. For example, the management module 308, in one example, manages a life insurance product. In this example, the management module 308 manages the benefits of the life insurance product such as a benefit payout by adjusting a monthly benefit payout to an insured person (or beneficiary).

In one embodiment, the server 306 comprises a database 310 including status level 312 that the management module 308 uses to manage the insurance scheme/product. The management module 308 generates or transforms the status level information 312 into an adjustment value for the insurance benefits. This process was discussed in greater detail above. The management module 308, in one embodiment, includes an expense module 314, a life changing events module 316, a calculating module 318, a wellness programme module 320 and a payment module 322. It should be noted that although this modules 314, 316, 318, 320 and 322 are shown as residing within the management module 308, one or more of these modules can reside outside of the management module 308 within the system 302 and/or across multiple information processing systems as well.

The operational flows shown in FIG. 1 illustrate one example of managing an insurance product according to one embodiment of the present invention. In particular, FIG. 1 shows a process performed by the management module 308 and its components 314, 316, 318, 320 and 322 within the information processing system(s) 302.

NON-LIMITING EXAMPLES

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

Although the various embodiments of the present invention are described in the context of a fully functional computer system, those skilled in the art will appreciate that embodiments are capable of being distributed as a program product via CD or DVD, e.g. CD, CD ROM, or other form of recordable media.

The invention claimed is:

1. A system for managing an insurance plan, comprising:
at least one computer server;
software stored on non-transitory storage medium and executable by said at least one computer, the software configured to:
(a) receive data relating to the occurrence of an insured event relating to disability, disease, or death with respect to an insured, including time information relating to the insured event,
(b) receive data relating to spending, unrelated to insurance premiums, by the insured;
(c) receive data relating to a degree of participation by the insured in wellness activities of a wellness program directed to reducing a likelihood of disability, disease, or death of the insured;
(d) calculate, on the occurrence of the insured event
(i) a spend amount relating to an amount spent by the insured over a period of time,
(ii) a percentage amount relating to a status level indicative of the degree of participation by the insured in the wellness program,
(iii) a subsidy amount by multiplying the calculated percentage amount by the calculated spend amount, and
(e) cause to effect payment of the subsidy amount to the insured person or a nominated beneficiary.

2. The system according to claim 1, the software further configured to receive information pertaining to a plurality of categories of expenses, and to calculate the subsidy amount for each of the received plurality of categories of expenses.

3. The system according to claim 2, wherein the plurality of categories of expenses includes at least one of food, clothing, transport, utilities, communication and accommodation expenses.

4. The system according to claim 1, wherein the data relating to spending received includes historical spending on the insured's credit card or debit card.

5. The system according to claim 1, wherein the data received pertaining to participation includes data pertaining to monitoring of the insured by a third party with respect to compliance in the wellness program by the insured person.

6. The system according to claim 1, wherein the data relating to the degree of participation received includes information associated with a plurality of separate and distinct occurrences of wellness program participation by the insured person.

7. The system according to claim 1, wherein the percentage amount calculated is based on a points value associated with the insured person for the wellness program, wherein the points value indicates the degree of participation in the wellness program.

8. A system for managing an insurance plan, comprising:
at least one computer server;
software stored on non-transitory storage medium and executable by said at least one computer, the software configured to:
(a) receive data relating to the occurrence of an insured event relating to disability, disease, or death with respect to an insured, including time information relating to the insured event,
(b) receive data relating to spending, unrelated to insurance premiums, by the insured;
(c) receive data relating to a degree of participation by the insured in at least one of approved related facilities, or services, of a wellness program directed to reducing a likelihood of disability, disease, or death of the insured;

(d) calculate, on the occurrence of the insured event
   (i) a spend amount relating to an amount spent by the insured over a period of time,
   (ii) a percentage amount relating to a status level indicative of the degree of participation by the insured in the wellness program, a higher percentage amount being associated with a higher degree of participation,
   (iii) a subsidy amount by multiplying the calculated percentage amount by the calculated spend amount, and
(e) cause to effect payment of the subsidy amount to the insured person or a nominated beneficiary.

9. The apparatus according to claim 8, the software further configured to receive data defining the plurality of categories of expenses.

10. The apparatus according to claim 9 wherein the plurality of categories of expenses includes at least one of the group consisting of food, clothing, transport, utilities, communication, and housing accommodation.

11. The apparatus according to claim 8, the software further configured to receive data defining a wellness program and data pertaining to monitoring the compliance of the insured in the wellness program.

12. A method for managing an insurance plan, comprising:
using at least one computer server to execute software stored on non-transitory storage medium connected to said at least one computer, the software configured to
(a) receive data relating to the occurrence of an insured event relating to disability, disease, or death with respect to an insured, including time information relating to the insured event,
(b) receive data relating to spending, unrelated to insurance premiums, by the insured;
(c) receive data relating to a degree of participation by the insured in at least one of approved related facilities, or services, of a wellness program directed to reducing a likelihood of disability, disease, or death of the insured of the insured;
(d) calculate, on the occurrence of the insured event
   (i) a spend amount relating to an amount spent by the insured over a period of time,
   (ii) a percentage amount relating to a status level indicative of the degree of participation by the insured in the healthcare program,
   (iii) a subsidy amount by multiplying the calculated percentage amount by the calculated spend amount, and
(e) cause to effect payment of the subsidy amount to the insured person or a nominated beneficiary during the lifetime of the insured.

13. The method of claim 12 wherein the data received relating to spending includes data pertaining to food, clothing, transport, utilities, communication, and housing.

14. The method of claim 12, wherein the insured event is at least one of one of childbirth and change in job.

15. The method according to claim 12, wherein the data received pertaining to participation includes data pertaining to monitoring of the insured with respect to compliance in the wellness program.

16. The method according to claim 15, wherein monitoring of the insured is performed by a third party.

17. The method according to claim 15, wherein monitoring of the insured relates to compliance with a wellness program.

18. The method according to claim 12, wherein participation in the healthcare program includes participation by the insured in at least one of gymnasium exercise, smoking cessation program, and weight loss program.

19. The method according to claim 12, wherein the status level is determined by relating a degree of participation to a point value, and the point value is compared to a plurality of point ranges, each point range in the plurality of point ranges being associated with a status level.

20. The method according to claim 12, wherein the nominated beneficiary is a third party goods or services provider.

21. The method according to claim 12, wherein the spend amount over a period time is calculated as one of an average historical spend amount or an actual spend amount.

* * * * *